United States Patent [19]

Miller et al.

[11] 3,827,804

[45] Aug. 6, 1974

[54] COLOR SEPARATION FOR DISCRIMINATION IN PATTERN RECOGNITION SYSTEMS

[75] Inventors: Melvin N. Miller, Wynnewood; Marshall S. Levine, Wayne; Melvin E. Partin, Montgomeryville, all of Pa.

[73] Assignee: Geometric Data Corporation, Wayne, Pa.

[22] Filed: Oct. 16, 1972

[21] Appl. No.: 298,062

[52] U.S. Cl. ............ 356/39, 356/178, 178/DIG. 36, 340/146.3 H, 356/102

[51] Int. Cl. ............ G01n 15/02

[58] Field of Search ............ 356/39, 178, 177, 205, 356/102; 350/172; 250/71 R; 340/146.3 B, 146.3 D, 146.3 F; 178/DIG. 36

[56] References Cited

UNITED STATES PATENTS

| | | | |
|---|---|---|---|
| 3,188,907 | 6/1965 | Trampel et al. | 356/205 |
| 3,284,566 | 11/1966 | James et al. | 350/172 |
| 3,315,229 | 4/1967 | Smithline | 356/39 |
| 3,330,904 | 7/1967 | Gebel | 356/177 UX |
| 3,497,690 | 2/1970 | Wheeless et al. | 250/71 R |
| 3,657,537 | 4/1972 | Wheeless et al. | 356/39 |
| 3,663,801 | 5/1972 | Wahli et al. | 340/146.3 B |
| 3,675,768 | 3/1969 | Legorreta-Sanchez | 356/39 |
| 3,699,336 | 10/1972 | Ehrlich et al. | 356/39 |
| 3,703,337 | 11/1972 | Neugroschel et al. | 356/178 |

*Primary Examiner*—Ronald L. Wibert
*Assistant Examiner*—R. J. Webster
*Attorney, Agent, or Firm*—Casesar, Rivise, Bernstein & Cohen

[57] ABSTRACT

A color separation system is provided for use in combination with a pattern recognition system which is particularly useful in blood cell analysis. The color separation means include filtering means for transmitting from a field having a plurality of patterns light in a plurality of spectral bands. Photomultiplier means are responsive to the filtering means for providing a pluarlity of electrical signals each of which varies in accordance with the light intensity in one of the spectral bands. The signals are utilized by the pattern recognition system and facilitate discrimination of predetermined patterns in the field.

6 Claims, 5 Drawing Figures

COLOR SEPARATION FOR DISCRIMINATION IN PATTERN RECOGNITION SYSTEMS

This invention relates generally to pattern recognition systems and more particularly to a color separation system to facilitate the discrimination and location of predetermined patterns in a field having more than a single class of patterns.

In co-pending U.S. application Ser. No. 117,996 filed Feb. 23, 1971, and now abandoned by Miller and Levine for a Pattern Recognition System a pattern recognition system is disclosed which has particular application in biological and natural or other systems. The system disclosed therein enables the classification of different patterns in accordance with the shape of the pattern. The system is unaffected by the disposition of the object in a two dimensional plane. The system can distinguish between the various white cells in a blood smear in order to make a differential white cell count in blood.

In order to make a differential white cell count in blood, a sample of whole blood is smeared and dried on a slide and a stain is used to enhance the contrast. In typical techniques utilized today, a hundred or more of the white cells are observed, recognized and classified in order to accomplish the differential white cell count. The Miller and Levine application hereinabove cited morphologically distinguishes the various ones of the white blood cells.

In addition to white cells, there are other classes of patterns which are disposed in a whole blood smear. For example, in addition to the white blood cells there are red blood cells and platelets. Typically, the whole blood smear is dyed with a Wright Stain which utilizes two dye components eosin and methylene blue. Due to the spectral absorbence of these dyes in the whole blood smear, the red blood cells appear reddish in the whole blood smear and the white blood cells appear bluish, with the exception of the eosinophil and neutrophil which appear to have a reddish cytoplasm but still retains a blue nucleus.

In accordance with this invention, the color of the various patterns found in a blood smear are utilized to enhance the discrimination and the ability to locate white blood cells in order to make a differential blood cell count.

It is therefore an object of the invention to utilize color separation to enhance pattern recognition systems.

Another object of the invention is to provide a new and improved color separation system which can be used in an optical pattern recognition system.

Still another object of the invention is to provide a new and improved pattern recognition system which utilizes color separation for discrimination of patterns with the recognition system.

Another object of the invention is to provide a new and improved pattern recognition system which enables the pattern disciminating portions to examine only a first class of patterns where more than one class of patterns are provided in a field.

Still another object of the invention is to provide a new and improved pattern recognition system for use in blood cell analysis which quickly locates white blood cells and facilitates the discernment between similarly shaped blood cells.

These and other objects of the invention are achieved by providing color separation means in a pattern recognition system having means for discriminating between a plurality of patterns in a field. The color separation means includes filtering means for transmitting from the field light in a plurality of spectral bands and converting means responsive to the filtering means for providing a plurality of electrical signals each of which varies in accordance with the light intensity in one of the bands. The signals are utilized by the pattern recognition system and facilitate the discrimination of predetermined patterns in the field.

Other objects and many of the attendant advantages of this invention will be readily appreciated as the same becomes better understood by reference to the following detailed description when considered in connection with the accompanying drawings wherein.

Referring now in greater detail to the various figures of the drawings wherein like reference numerals refer to like parts, the pattern recognition system embodying the invention is shown generally in FIG. 1.

Figure 1:
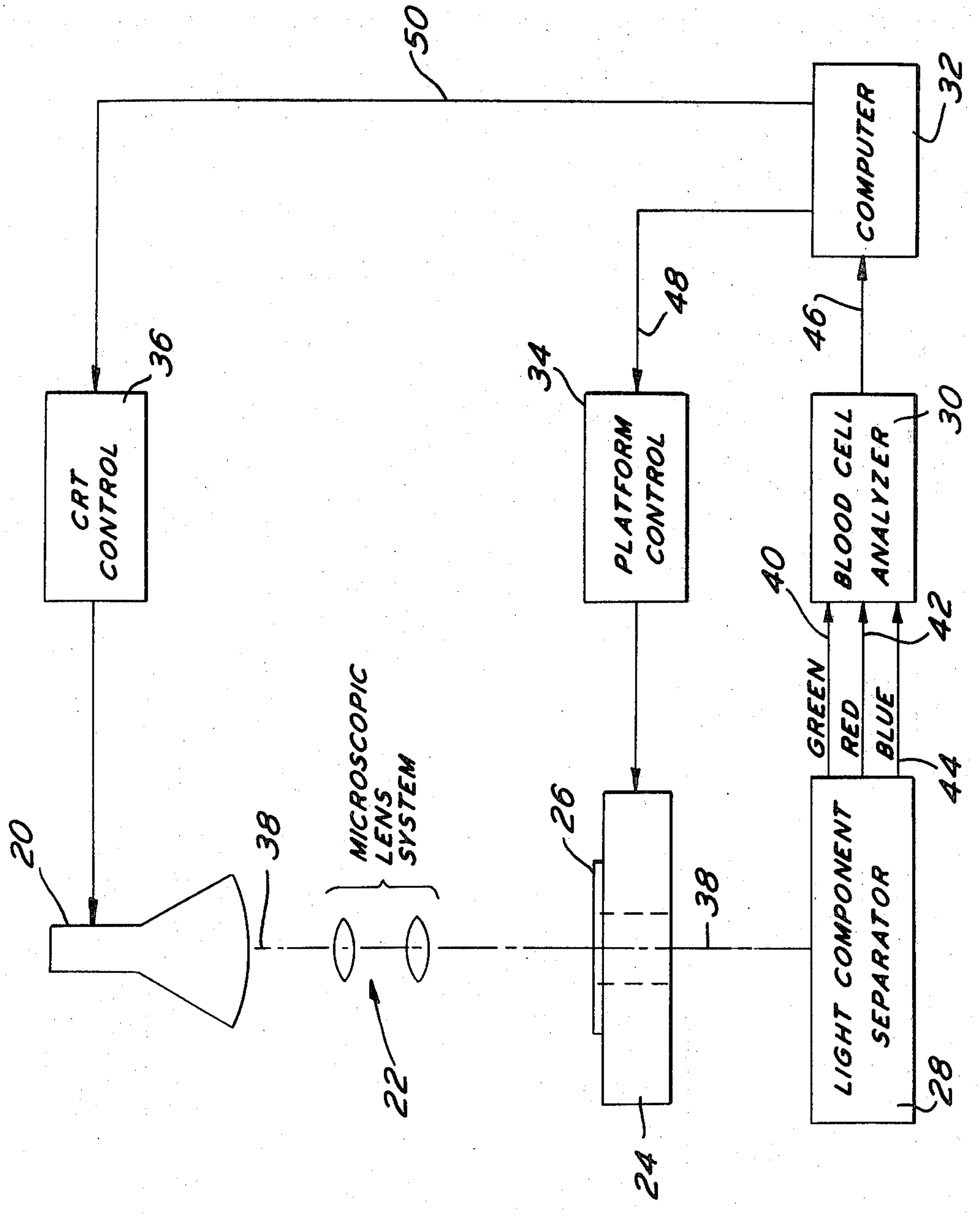
FIG. 1 is a schematic block diagram of a pattern recognition system embodying the invention.

The pattern recognition system shown in FIG. 1 is adapted for blood cell analysis. The system includes a flying spot scanner comprised of a cathode ray tube 20, a microscopic lens system 22, a platform 24 for supporting a glass slide 26 having a whole blood smear thereon, a light component separator 28, a blood cell analyzer 30, a computer 32, a platform control 34 and a cathode ray tube control 36. A preferred pattern recognition system in which the instant invention is contemplated to be used is shown in the aforementioned application Ser. No. 117,996 filed Feb. 23, 1971.

The cathode ray tube (CRT) 20 and the microscopic lens system 22 are preferably mounted within a housing which is light sealed so that a beam of light 38 which is shown as a broken line in FIG. 1 can be directed through a microscopic lens system for focusing on slide 26. Similarly, the platform 24 and the light component separator 28 are also encased in a housing to prevent light other than the beam of light 38 from entering the light component separator. The beam of light 38 is produced by the cathode ray tube 20 which provides the beam in an approximately 3 inch by 3 inch scan raster on the face of the cathode ray tube which is directed and focused by the microscopic lens system down to a field of a size approximately 300 microns by 300 microns. Thus a scan raster of light is directed at the slide 26 to traverse an approximately 300 by 300 micron field in the blood smear. The light passing through the slide 26 is directed to the light component separator 28 which filters the incoming beam and provides light through three spectral channels. The red, green and blue channels are chosen in accordance with the spectral absorbence of the component dyes in the Wright Stain.

The light component separator 28 includes conversion means for converting the three light components into electrical signals provided on lines 40, 42 and 44 which are representative of the green, red and blue channels, respectively. The blood cell analyzer 30 utilizes information in the signals for locating the white blood cells among the red blood cells and for discriminating between the various white cells to provide the white cell differential count. After the various patterns are detected, a signal is provided to computer 32 via lines 46 which indicates among other occurences a detection or recognition of particular white cells in a field which is utilized by the computer 32 to control the platform control 34 and the cathode ray tube control 36.

The computer 32 is connected to the platform control 34 via lines 48 and causes the platform control to move the platform 24 to a next position so that another field within the blood cell smear can be examined for distinguishment of further white blood cells. The platform control includes a stepping motor for moving the platform 24 in a predetermined pattern to assure that a separate and distinct field is viewed in each of the succeeding scans of the slide 26. The computer also provides signals via lines 50 to CRT control 36 to provide the necessary voltage control for scanning predetermined areas and to start up the scan raster after a previous field has been scanned.

Figure 2:
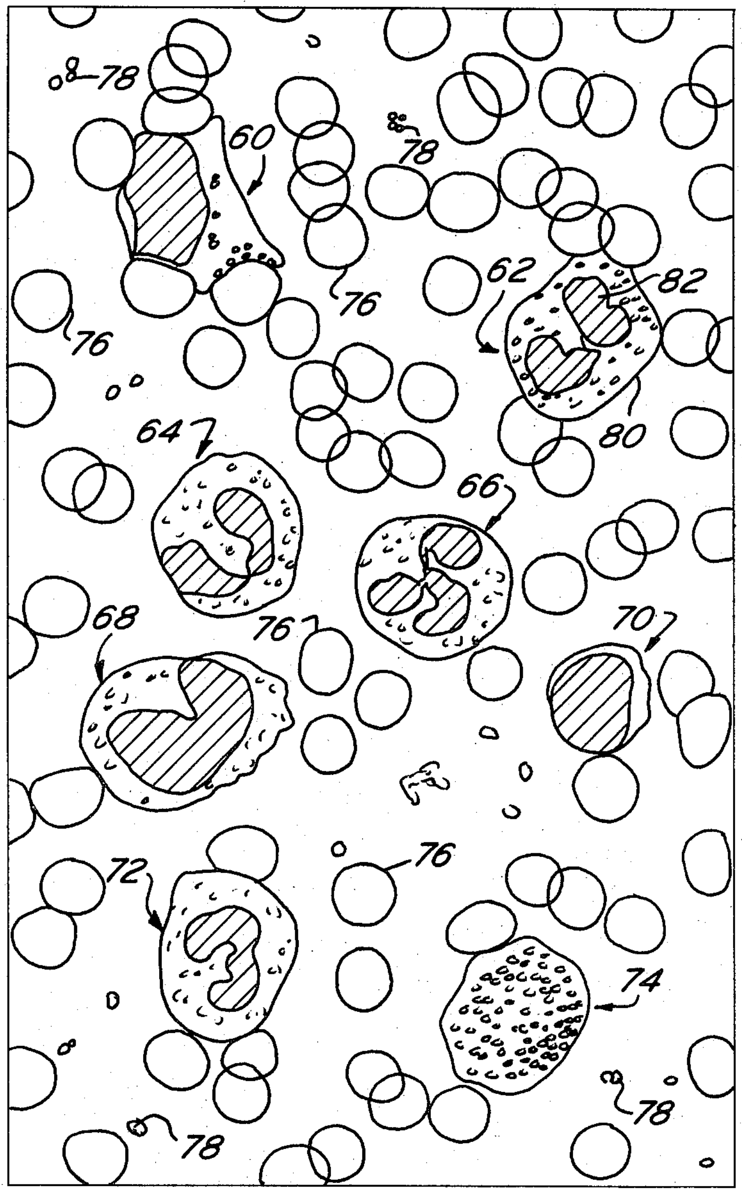
FIG. 2 is an enlarged top plan view of a rectangular portion of a whole blood smear.

Referring now to FIG. 2, wherein a blood smear is diagrammatically shown of peripheral blood from normal type individuals. As can be seen therein, there are various clases of patterns within a blood smear. A first class of patterns in the blood smear are the white blood cells which include cells, 60, 62, 64, 66, 68, 70, 72 and 74. Cell 60 is a lymphocyte white cell, cell 62 is a neutrophillic segmented white cell, cell 64 is an eosinophil white cell, cell 66 is a neutrophillic segmented white cell, cell 68 is a monocyte white cell, cell 70 is a lymphocyte white cell, cell 72 is a neutrophillic band white cell and cell 74 is a basophil white cell.

A second class of the patterns found in the blood smear are the red cells 76 which are found throughout the blood smear around and adjacent to the various white cells. In addition, there is a third class of patterns which are comprised of platelets 78 which are also scattered throughout the blood smear.

Aside from the fact that the red cells are smaller than the white cells, a visual inspection of the blood smear enables the white cells to be readily discerned from the red cells in view of the coloring of the white cells and the red cells. That is, the red cells appear red whereas the white cells, as a result of the absorption of the component dyes in the Wright Stain appear bluish or a deep purple. The platelets 78 are also a deep purple or blue in color but are much smaller than the white blood cells.

The white cells of the neutrophillic type, cells 62, 66, and 72, respectively, are somewhat similar in shape to the eosinophil cell 64. It should be noted that both of these types of white cells include a cytoplasm and a nucleus portion. The cytoplasm of cell 62, for example, is denoted by reference numeral 80 and the nucleus is denoted by the reference numeral 82. The cytoplasm of the neutrophil is substantially blue or purple relative to the cytoplasm of the eosinophil 64 is reddish orange in view of the fact that the spherical granules in the cytoplasm have a particular affinity for the eosin stain. Thus as between the neutrophil segmented and the eosinophil the major difference is the coloring of the cytoplasm after the Wright Stain has been applied to the blood smear.

Figure 3:
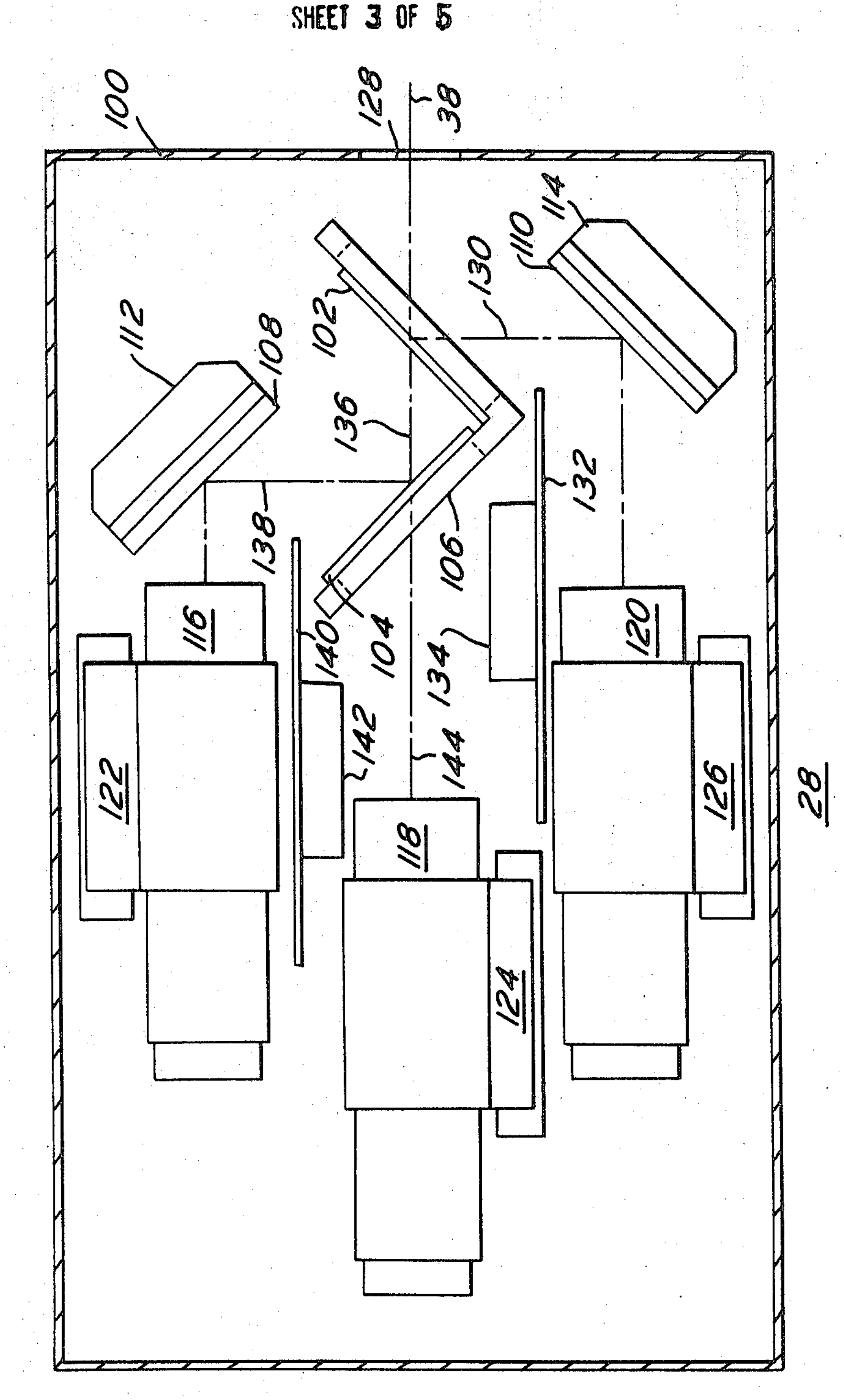
FIG. 3 is a top plan view of the light component separator.

Referring now to FIG. 3, a top plan view is shown of the light component separator 28. Light component separator 28 is provided in a preferably rectangular light sealed housing 100 and includes a pair of dichroic mirrors 102 and 104 which are vertically disposed. The dichroic mirrors 102 and 104 are mounted at right angles with respect to each other by an L-shaped bracket 106 which supports the mirrors 102 and 104 at the lowermost end of the mirrors so that the mirrors may be used to transmit light rays as well as reflect light rays. A pair of conventional rectangular planar mirrors 108 and 110 are also provided. Mirror 108 is mounted in a vertical plane by a bracket 112 and is disposed in a plane parallel to mirror 104. Mirror 110 is mounted by a bracket 114 and is disposed in a plane parallel to mirror 102. Three photomultipliers 116, 118 and 120 are provided which are supported by suitable brackets 122, 124 and 126, respectively. An opening 128 is provided in housing 100 adjacent dichroic mirror 102.

The light beam 38 which emanates from the blood smear on slide 26 enters the opening 128 and extends at approximately a 45° angle with respect to dichroic mirror 102. Dichroic mirror 102 is preferably of the type which reflects green and passes the remainder of the light component. A preferred dichroic mirror is the Fish Schurman No. 153*c* green reflector. The green component of the light beam 38 is passed along beam 130 which is reflected at a right angle by mirror 110 directly into the photomultiplier tube 120.

An opaque plate 132 is provided between mirror 110 and mirror 106 and extends parallel to photomultiplier 120 to prevent spurious light from being directed towards the photomultiplier 120. Plate 132 is vertically disposed and is supported and secured to the base of the housing 100 by a flange 134.

The component of the light remaining after the green portion of light beam 38 is reflected out of the beam by dichroic mirror 102 is passed through dichroic mirror 102 along beam 136 to dichroic mirror 104. Mirror 104 extends at approximately a 45° angle with respect to beam 136. The dichroic mirror 104 is preferably a Fish Schurman No. 8 blue reflector. The blue component of light beam 136 is thus reflected at a right angle from beam 136 in beam 138 which is reflected at a right angle by mirror 108 to the photomultiplier tube 116.

An opaque plate 140 is provided which is vertically disposed between the mirror 104 and the photomultiplier tube 116 which prevents spurious light from entering the photomultiplier tube 116. The plate 140 includes a flange 142 which is mounted on the base of the housing 100. After the green and blue components of the beam 38 are subtracted from the signal by the mirrors 102 and 104, the remaining portion passes with beam 144 to the photomultiplier tube 118. It can therefore be seen that the entire spectrum of light is provided on line 38 and then is separated into a red, blue and green component thereof by dichroic mirrors 102 and 104. That is, dichroic mirror 102 reflects the green spectral band of light from the beam 38 to the photomultiplier 120, the dichroic mirror 104 reflects the blue spectral band of light to the photomultiplier 116 and the photomultiplier 118 receives the red spectral band of light from beam 38 after the blue and green portions are reflected out of the beam by dichroic mirrors 102 and 104.

Figure 4:
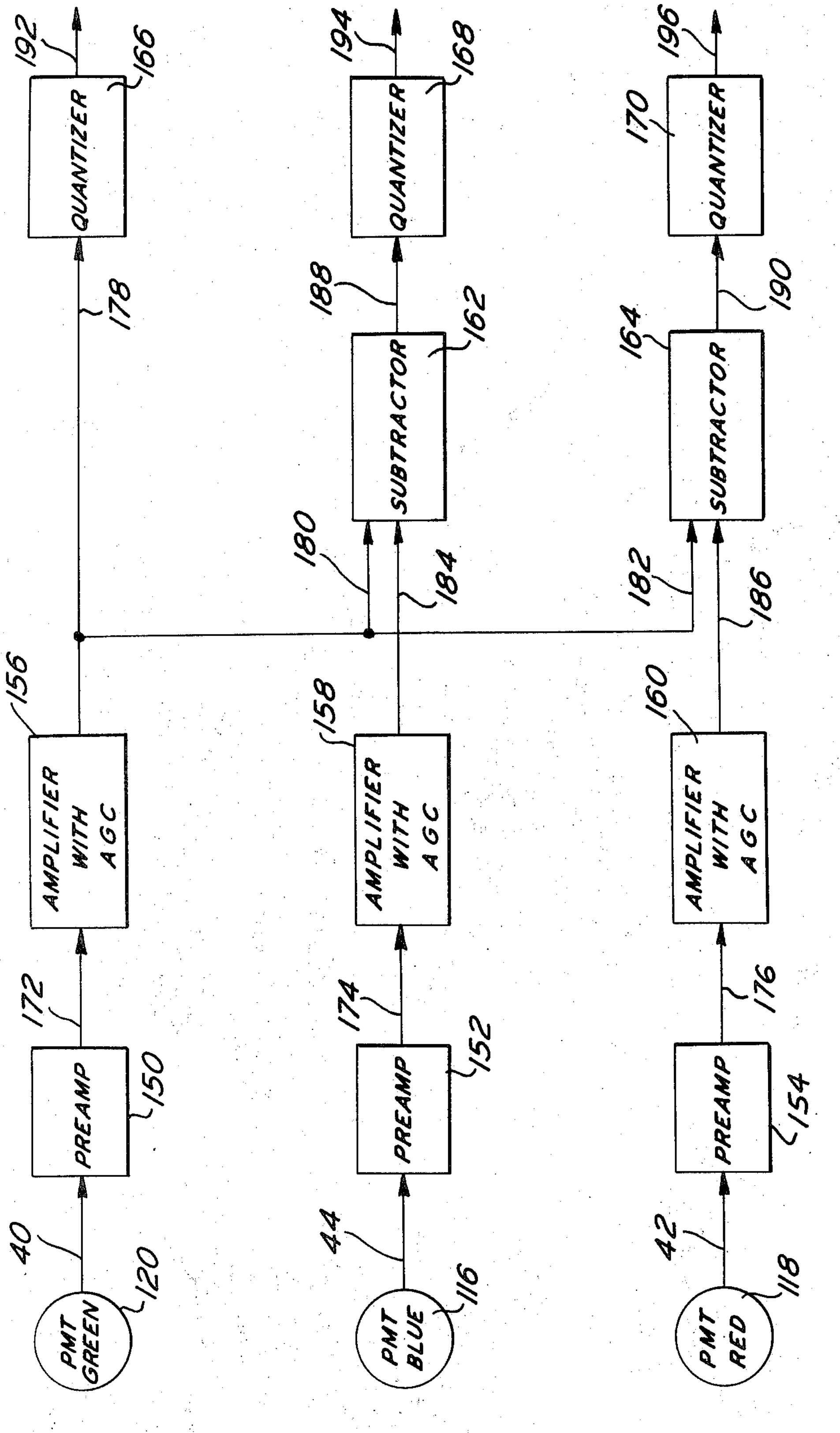
FIG. 4 is a schematic block diagram of the analog portion of the blood cell analyzer.

Referring now to FIG. 4 wherein the photomultiplier tubes (PMT) 116, 118 and 120 are represented schematically on the leftmost side of the figure. The output of the photomultiplier tube 120 is provided on line 40 to a preamplifier (PREAMP) 150, the output of photomultiplier 116 is provided on line 44 to preamplifier 152 and the output of photomultiplier tube 118 is provided on line 42 to the preamplifier 154. In addition to the preamplifiers the analog circuitry of the blood smear analyzer includes three amplifiers with automatic gain control (AGC) 156, 158 and 160 which are associated respectively with the green, blue and red channels. The circuitry further includes a pair of subtractors 162 and 164 and three quantizers 166, 168 and 170. Quantizers 166, 168, and 170 are conventional quantizers, each of which provide a binary "1" output when the threshold level of the quantizer is exceeded and a binary "0" output when the threshold level of the quantizer is not exceeded. A discussion of quantizing appears both in U.S. Pat. Nos. 3,104,372 and 3,234,513. The output of preamplifier 150 is connected via line 172 to the amplifier 156, the output of preamplifier 152 is connected via line 174 to amplifier 158 and the output of preamplifier 154 is connected via line 176 to the amplifier 160.

Each of the amplifiers 156, 158 and 160 include automatic gain control to control the gain of the amplifier to compensate for the various changes in the photomultiplier response as the system is used. The output of amplifier 156 is connected to quantizer 166 via line 178, to subtractor 162 via line 180 and to subtractor 164 via line 182. The amplifier 158 is connected to subtractor 162 via line 184 and forms the second input thereof. The amplifier 160 is connected to the second input 186 of subtractor 164. The output of subtractor 162 is connected via output line 188 to quantizer 168, the output of subtractor 184 is connected via line 190 to quantizer 170.

Quantizers 166, 168 and 170 thus provide the binary quantizations required by the blood cell analyzer. Quantizer 166 produces a binary quantization of the green signal provided by line 40 from the photomultiplier tube 120, the quantizer 160 provides a quantization of the difference signal between the green channel and the blue channel signals provided by lines 40 and 42 from the green photomultiplier tube 120 and the red photomultiplier tube 118.

The green channel as represented by photomultiplier tube 120 which provides the signals which are suitably amplified and provided to quantizer 166 provides the necessary information for distinguishing the shape of the nucleus with respect to the cytoplasm of a white cell and is the preferred channel for determining the shape of the pattern for discriminating the pattern from the various white cell patterns. The output of quantizer 166 is provided on output line 192 to the digital portion of the blood cell analyzer.

Quantizer 168 receives the difference signal on line 188 from subtractor 162 which subtracts the blue signal from the green signal. That is, the signal provided on the blue channel and the green channel are subtracted from each other to provide a difference signal on line 188 which is quantized by quantizer 168 and provided to the digital portion of the blood cell analyzer on output line 194. The quantized signal on line 194 from quantizer 168 is substantially devoid of any red cell information. That is, a binary quantization of the white blood cell pattern and the platelets are substantially all that is provided on line 194 in view of the fact that the red cell information is removed by the subtraction of a blue signal from the green signal. This is because the photomultiplier's response to light from the red cells is approximately equal in both the blue and green channel photomultipliers. Thus, the photomultiplier responsive to the green spectral channel of light receives approximately the same amount of red from the red cell as the photomultiplier responsive to the blue channel which also receives approximately the same amount of the light from the red blood cell. Accordingly, by subtracting the blue from the green or vice versa, the red components of the light from the blood smear are cancelled out and thereby provide substantially no information from the red cell. Thus quantizer 168 provides a red cell free signal which enables the white cells to be easily distinguished without having to determine the size of the red cells in order to distinguish the white cells.

Quantizer 170 receives a difference signal from subtractor 164. Subtractor 164 receives the red channel signal and the green channel signal and subtracts the green channel signal from the red channel signal. It should be remembered that the eosinophil cytoplasm has a particular afinity for the eosin stain. If it were the same red as the red cells it would also disappear in the green minus blue channel. However, in fact the cytoplasm which is red in the eosinophil white cells is not exactly the same red as red cells so it doesn't cancel. Thus by combining the green and red channels in subtractor 164 there is a particularly high response on line 190 when an eosinophil is scanned by the flying spot scanner. The difference signal 190 is provided via the quantizer 170 in binary quantization form via line 196 to the digital portion of the blood cell analyzer to facilitate the discernment of the eosinophil from similarly shaped white cells of different types.

Figure 5:
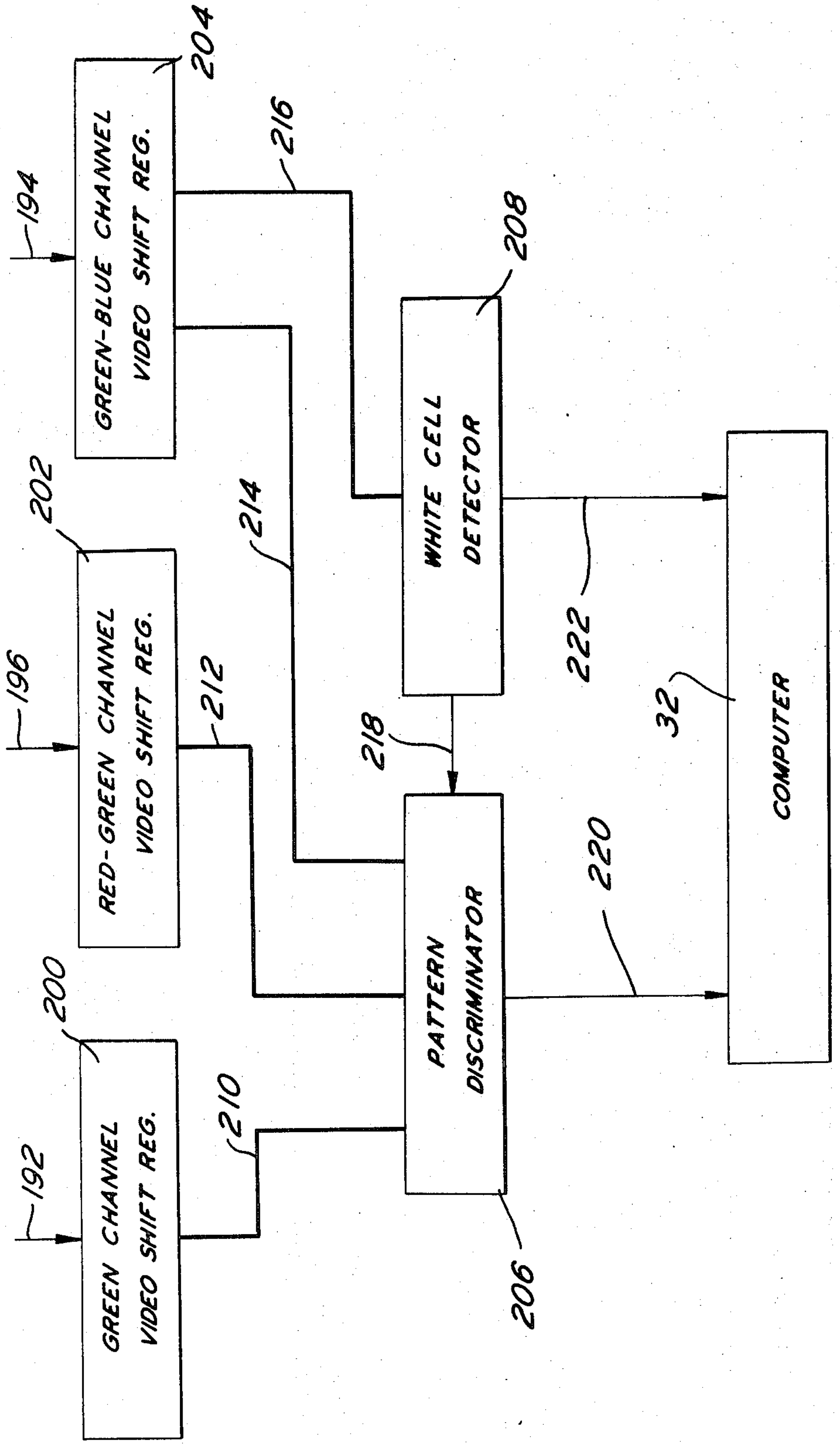
FIG. 5 is a schematic block diagram of the digital portion of the blood cell analyzer.

Referring now to FIG. 5 wherein the block diagram of the digital portion of the blood cell analyzer is shown. The digital circuitry includes a green channel video shift register 200, a red minus green channel shift register 202 and a green minus blue channel video shift register 204. The quantized signals on line 192, 196 and 194 are shifted into the shift registers 200, 202 and 204, respectively. In addition to the video shift register, a pattern discriminator 206 and a white cell detector 208 are provided. The video shift register 200 is connected via cable 210 to the pattern discriminator, the shift register 202 is connected via cable 212 to pattern discriminator 206 and the video shift register 204 is connected via cable 214 to the pattern discriminator 206. In addition, the video shift register is connected via cable 216 to the white cell detector 208. The white cell detector 208 is also connected via lines 218 to the pattern discriminator 206.

The output of pattern discriminator 206 is connected via lines 220 to the computer 32 and the output of white cell detector 208 is also connected to computer 32 via lines 222. The pattern discriminator 206 is preferably of the type shown in the aforementioned copending application Ser. No. 117,996 of Miller and Levine. The information provided in the video shift register 200 is utilized by the pattern discriminator 206 for the morphological analysis of the shapes in the field of the blood smear. The information provided in the video shift register 202 is also analyzed for content to determine whether the shape of the white cell located in video shift register 200 is of the eosiniphil type as determined by the information in the red-green channel video shift register 202.

The green-blue channel video shift register 204 information is analyzed by the pattern discriminator 206 for providing the overall shape of a white cell as opposed to the nucleus which is more clearly defined in the green channel video shift register 200.

In addition, the white cell detector is also responsive to a pattern in the green-blue channel video shift register 204 to determine whether a white cell is within the scan of the flying spot scanner 20 in FIG. 1. That is, the white cell detector 208 includes a mask which is effectively in the shape of a plus sign which is superimposed over an area of approximately one-third the length of a white cell. If a pattern exists in the video shift register which is large enough to fill the plus sign shaped mask it indicates that a white cell has been detected within the raster scan over the blood smear. When a white cell is detected within the scan the pattern discriminator 206 is advised by a signal on lines 218 to analyze the white cell information which is presently located within video shift registers 200, 202 and 204. Thus, the various binary quantizations in registers 200, 202 and 204 are examined simultaneously as the signals are shifted therethrough. Accordingly the information in all three registers is simultaneously available for distinguishing and discrimination.

It should be understood that the video shift registers 200, 202 and 204 may also be replaced by two shift registers with a coded representation of the quantizations in each of the quantizers. Similarly, more quantizations of the signals provided on lines 178, 188 and 190 may also be provided by providing more quantizers which are biased at different reference levels. In this way, more definition between the nucleus and cytoplasm can be accomplished for distinguishing the shapes of the various white cells.

The outputs of the pattern discriminator and the white cell detector 206 and 208, respectively, are provided to the computer 32 which controls the cathode ray tube and the platform 24 so that further areas of the blood smear on the slide 26 can be examined. The computer also includes counters and memory banks for storing the number of white cells and the different types of white cells found in a typical blood smear.

The computer is also used to correlate the information provided in each of the shift registers 200, 202 and 204. That is, the shape of a blood cell which is recognized in shift register 200 is combined with the information concerning its color characteristics provided by the examination simultaneously of shift registers 202 and 204.

It can therefore be seen that a powerful tool has been provided for adding information to the type of information which is normally utilized in pattern recognition systems for distinguishing between morphological shapes. In addition, the color separation facilitates distinguishment of a specific class of shapes that are to be distinguished among themselves. The use of different color channels and different signals from combinations of the channels provides not only an effective tool for finding specific classes of shapes but also for defining the borders of the shapes for distinguishing among the shapes.

Without further elaboration, the foregoing will so fully illustrate our invention that others may, when applying current or future knowledge, readily adapt the same for use under various conditions of service.

What is claimed as the invention is:

1. A pattern recognition system for use in distinguishing white blood cells in a whole blood smear comprising means for scanning a field in said whole blood smear, said means for scanning generating light in accordance with the color of said images in said field, quantization means for generating binary signals representative of the positions of said field scanned, storage means responsive to said quantization means for serially shifting and storing said binary quantization, and pattern recognition means connected to said storage means for analyzing the binary quantization of said field for distinguishing the pattern scanned in said field wherein the improvement comprises color separation means for receiving said generated light from said means for scanning, said color separation means including filtering means for transmitting from said light in said field light only in a predetermined plurality of portions of the light spectrum, means responsive to said filtering means for providing a plurality of electrical signals, each of which varies in accordance with the light intensity in one of said portions of the light spectrum, said means responsive to said filtering means including means for removing from said plurality of electrical signals essentially all of said signals representative of a red cell, said means responsive for generating a resulting signal which is connected to said quantization means, said quantization means receiving said resulting electrical signal and for providing the binary quantization thereof for each position of the field scanned, said binary quantization of said field including white cell information and an insubstantial portion of red cell information so that red cell information is not analyzed during analysis of said binary quantization.

2. The pattern recognition system of claim 1 wherein said means for removing information relative to red blood cells includes means for combining a pair of said electrical signals, said combining means comprising a subtractor, said combining means receiving signals, each of which includes approximately the same amount of red cell information so that subtraction of one of the signals from the other causes removal of the red cell information.

3. The pattern recognition system of claim 1 wherein said scanning means comprises a flying spot scanner and a microscopic lens system for focusing a beam of light from said scanner onto said field in said blood smear.

4. The pattern recognition system of claim 2 wherein said plurality of portions of the light spectrum comprise the green, blue and red spectral bands and said combining means receives signals representative of the blue and green spectral bands.

5. The pattern recognition system of claim 1 wherein said system includes a plurality of means for combining each of which combines a different combination of said electrical signals, said quantizing means including a plurality of quantizers each responsive to one of said combined electrical signals, said plurality of combined signal quantizers providing additional information to said pattern recognition system for discrimination of predetermined patterns in said field.

6. The pattern recognition system of claim 1 wherein said color separation means includes a plurality of dichroic mirrors which are used to separate the components of light from said field into the red spectral band, the green spectral band and the blue spectral band.

* * * * *